March 17, 1959  L. D. STATHAM  2,878,352
ELECTRICAL MOTION SENSING MEANS
Filed Dec. 14, 1954  3 Sheets-Sheet 1
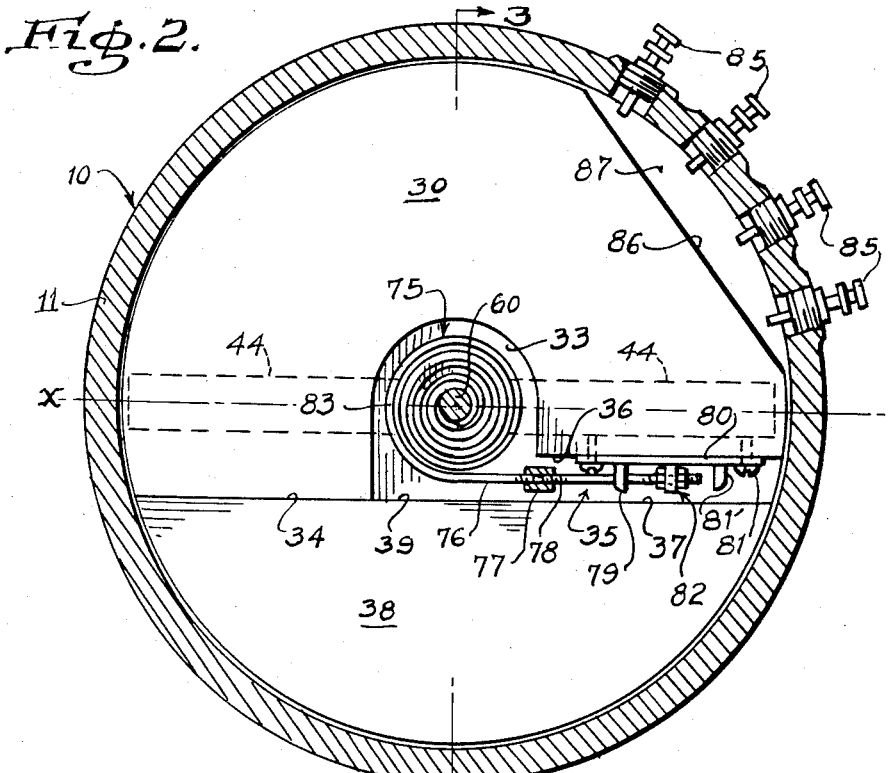
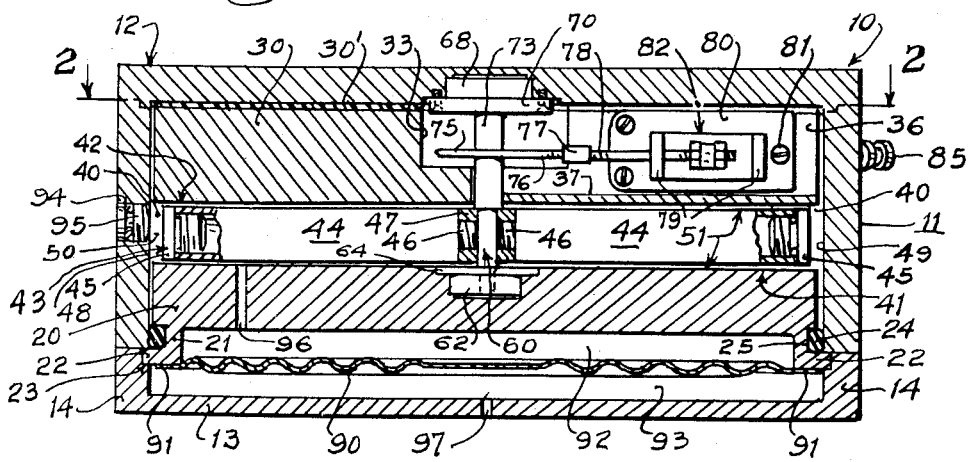
INVENTOR.
LOUIS D. STATHAM
BY
ATTORNEY.

March 17, 1959 — L. D. STATHAM — 2,878,352
ELECTRICAL MOTION SENSING MEANS
Filed Dec. 14, 1954 — 3 Sheets-Sheet 2

INVENTOR.
LOUIS D. STATHAM
By Philip Subkow
ATTORNEY.

March 17, 1959  L. D. STATHAM  2,878,352
ELECTRICAL MOTION SENSING MEANS
Filed Dec. 14, 1954  3 Sheets-Sheet 3
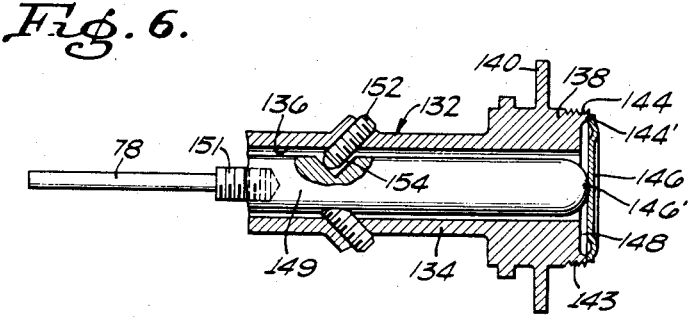
Fig. 6.
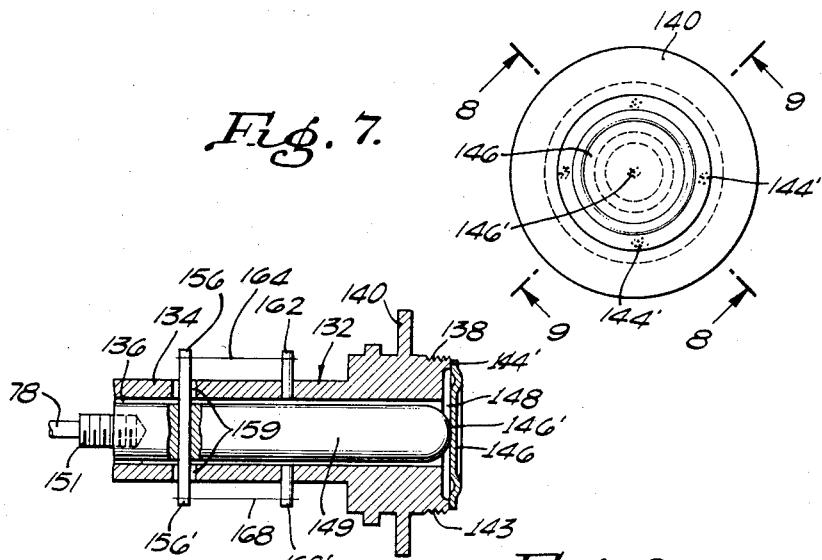
Fig. 7.
Fig. 8.
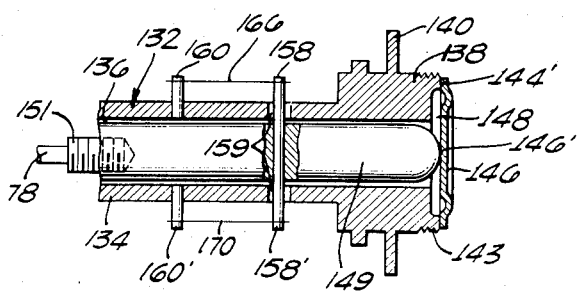
Fig. 9.
INVENTOR.
LOUIS D. STATHAM
BY Philip Subkov
ATTORNEY.

United States Patent Office 2,878,352
Patented Mar. 17, 1959

2,878,352

ELECTRICAL MOTION SENSING MEANS

Louis D. Statham, Beverly Hills, Calif., assignor to Statham Instruments, Inc., a corporation of California Application December 14, 1954, Serial No. 475,175

17 Claims. (Cl. 201—63)

This invention relates to accelerometers employing a seismic mass and a mechanical or electro-mechanical transducer as a motion responsive device. This invention relates also to means for extending the range of permissible displacement of the seismic mass without any substantial reduction in the linearity of response of the transducer to the displacement of the said mass. More particularly, this invention is directed to a liquid rotor, low natural frequency angular accelerometer.

This application is a continuation-in-part of my co-pending applications Serial No. 430,226, filed May 17, 1954; Serial Nos. 431,760 and 431,764, both filed May 24, 1954; Serial No. 241,539, filed August 13, 1951; Serial No. 328,416, filed December 29, 1952; and Serial No. 354,294, filed May 11, 1953.

It is a characteristic of this invention that means are provided to vary the displacement, natural frequency of the seismic mass and range of sensibility to acceleration independently of the spring constant or stiffness of the transducer which may be connected to the mass. It is also a characteristic of this invention that instead of using a solid mass suspended on springs, as in the prior art, I employ a liquid mass as the effective inertial mass and measure displacement of the liquid mass relative to the container subjected to the motion to be sensed.

It is still another characteristic of this invention that means are provided including a movable member which may be a seismic mass or a member responsive to the displacement of a seismic mass, for example, an accelerometer such as shown in my above-mentioned copending applications, and a transducer composed of two elements movable relative to each other and whose relative motion is subject to a constraint wherein the magnitude of displacement of the seismic mass upon acceleration may be controlled independently of the stiffness of said constraint. In the preferred embodiment this control is obtained by introducing a resilient connection between the transducer and the movable member, the stiffness of said connection being preferably less than the stiffness of said constraint and whose stiffness is controlled to give the desired displacement upon application of a given accelerating force.

In the particular form of this invention as disclosed in this application the movable means is made sensitive to an angular acceleration and is moved angularly upon application of said angular acceleration.

This invention is particularly useful in connection with the application of electrical resistance strain wire transducers in which the application of a load varies the strain in a fine wire resulting in a change in resistance which is proportional to the strain induced in the wire. Such transducers have been applied to linear accelerometers as is illustrated in the Statham Patent No. 2,573,285, issued October 30, 1951. In such systems the spring constant and permissible magnitude of strain which may be induced in the strain wire determines the natural frequency, and the number of wires and their spring constant determines the mass that must be employed to obtain the desired displacement on application of the accelerating force.

Since in such transducers the values of the strain wires employed place a practical limit on the permissible strain which may be developed in the fine wires which are used in such strain wire transducers, the wires must be made either excessively long or one is forced to accept a relatively larger value of the natural frequency.

Modern instrumentation requires that the accelerometers be made very small. Such size limitations impose a restriction on the permissible length of the strain wires and also impose a restriction on the permissible mass of the inertial element, thus resulting in accelerometers having relatively high values of their natural frequency and small permissible displacements of their inertial masses. Another consequence of this design is that in order to reduce the natural frequency and increase the permissible displacement the weight of the inertial mass must be made relatively larger and a sufficient multiplicity of wires must be looped between the mass and the frame on which the mass is suspended in order that the desired displacement be obtained within the limits of the permissible strain on the wire.

One object of this invention is to provide a motion sensing device to permit variation of the displacement of the movable member thereof independently of the stiffness of the transducer connected to said movable member for sensing the motion thereof.

It is another object of my invention to design an accelerometer in which an inertial mass is connected to an electrical strain wire transducer and in which the displacement of the mass may be made independent of and different from the variation in extension of the wire resulting from the displacement of the mass.

It is another object of my invention to provide an accelerometer having a liquid mass associated with a yieldable member and a transducer, whereby the movement of the mass is sensed by the transducer.

It is a particular object of my invention to design an angular accelerometer having a liquid mass operatively associated with a yieldable member, whereby the movement of the mass is sensed by an electrical strain wire transducer, so that a motion of the mass on acceleration causes a variation in extension of the strain wires.

I obtain these results by a motion sensing device comprising a movable member, a transducer including two relatively movable members, means having stiffness to constrain the relative motion of said relatively movable members, and means for resiliently connecting said first movable member and said relatively movable members, said resilient connecting means preferably having a stiffness less than the stiffness of the constraint between the relatively movable members. In the preferred embodiment, the resilient connection is included in a motion transmitting device which is responsive to the motion of the first movable member (the seismic mass in an accelerometer) and which transmits said motion to the relatively movable members.

In the preferred embodiment of the invention directed to accelerometers, I connect the inertial mass to the transducer, or the strain wire thereof where this type of transducer is used, by means of a flexible connection, e. g., a spring, so that the spring and the wires are in series and the motion of the mass causes a variation in the resilient suspension and this causes a variation in extension of the wires. By adjusting the relative spring constant of the spring and the wires I maintain for any chosen variation of extension of the wires to be obtained upon a chosen acceleration, any desired displacement of the mass upon such acceleration. Thus, by making the spring constant of the resilient suspension less than that of the wires, I may cause a displacement of the mass which is greater in magnitude than the simultaneous variation in extension of the strain wires.

By this arrangement I may without changing the magnitude of the inertial mass or the number or length of strain wires employed, obtain a reduction in the natural frequency or in the alternative for like frequencies, reduce the mass which must be employed with the strain wires where the mass is connected directly to the strain wires without the interposition of a yieldable suspension. The reduction in the mass will thus permit the construction of instruments for the same natural frequency which would be much smaller than those made necessary by the connecting of the mass directly to the strain wires.

By increasing the permissible displacement of the mass, a much lower natural frequency can be obtained than would be obtained by connecting the mass directly to the wire, so that the instrument will be insensitive to high frequencies and sensitive to low frequencies, i. e., will filter out high frequencies.

As in the devices, for example, of my above copending applications Serial Nos. 431,760 and 431,764, I employ a liquid mass and provide means sensitive to the displacement of the liquid mass relative to the container subjected to the motion to be sensed, instead of using a solid mass suspended on springs, whereby the nature and character of the displacement of the mass on the springs are a measure of the magnitude and nature of the motion. For this purpose a paddle is mounted in the container so that the paddle may pivot. As a result of the relative motion of the liquid and container, a couple is thus created which causes the paddle to pivot on its axis and this motion may be sensed by my strain wire transducer. Because, as stated above, I use as the effective inertial mass a liquid mass and do not employ a solid mass as the effective inertial mass, I avoid the use of hinges and pivots of the size necessary where the effective inertial mass is solid rather than liquid.

The objects and advantages of the invention will be more readily understood from the following description of a preferred embodiment of my invention taken in connection with the accompanying drawings wherein:

Fig. 1 is a broken sectional view of my device;

Fig. 2 is a plan view, partly in section, taken on the line 2—2 of Fig. 1;

Fig. 6 is a sectional view of one type of transducer in the form of an electrical strain wire transducer which I can use in my device;

Fig. 7 is an end view of the structure shown in Fig. 6;

Fig. 8 is a section taken on line 8—8 of Fig. 7; and

Fig. 9 is a section taken on line 9—9 of Fig. 7.

Figure 3:
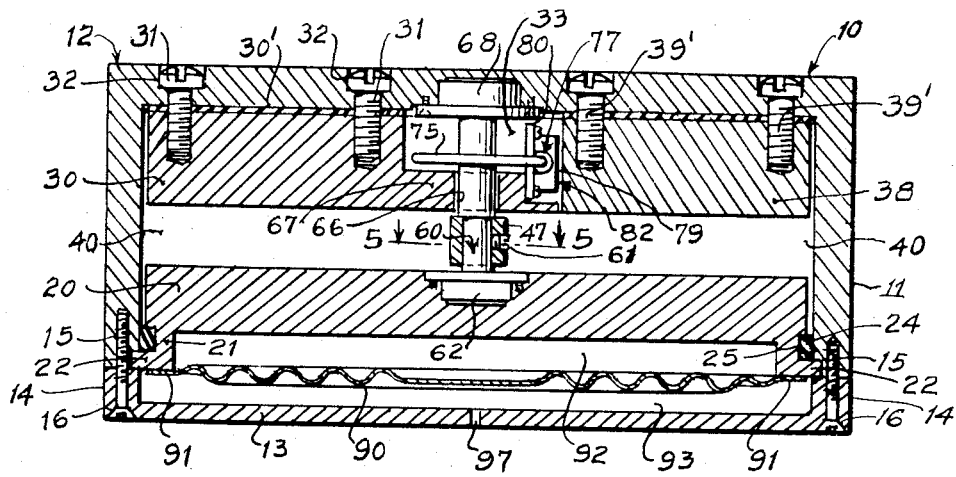
Fig. 3 is a section taken on line 3—3 of Fig. 2.

The device shown in the drawings has a cylindrical case or body portion 10 having a cylindrical side wall 11 and top 12 formed integral therewith. A bottom member 13 having a peripheral vertical flange 14 is connected to the lower end of the cylindrical side wall 11 of the container by screws 15 disposed in recesses 16 near the outer periphery of the bottom member 13, the screws passing through flange 14 and into the abutting lower end of wall 11.

Disposed diametrically across the lower portion of the cylindrical container 10 is a lower cylindrical baffle plate 20, having a downwardly extending integral flange 21 positioned closely adjacent the outer periphery of plate 20. The lower end of flange 21 is bent outwardly to form a peripheral lip 22 which fits into a peripheral recess 23 formed in the upper inner surface of flange 14, for supporting the baffle plate 20. The upper outer surface of the lip 22 abuts the lower end of cylindrical wall 11, and an O-ring liquid seal 24 is disposed between flange 21 and wall 11 in a recess 25 formed by the outer surface of flange 21, the upper surface of lip 22, and the lower peripheral surface of baffle plate 20.

Positioned in the upper portion of container 10 and spaced from lower baffle plate 20 are upper baffle plates 30 and 38 positioned adjacent each other. Plate 30 is connected to the top 12 of the container by screws 31 and plate 38 is similarly secured to the top 12 by screws 39', said screws being sunk in recesses 32 in the top 12. A gasket 30' is provided between the baffle plates 30 and 38, and the top 12 of the container. It is noted that upper baffle plate 30 is substantially semi-cylindrical in shape (see Fig. 2), and has a central U-shaped recess 33 extending downwardly into the plate from the upper surface thereof. The plate 30 extends somewhat farther than semi-cylindrically about the container 10, and has a chordal end wall or surface 34 parallel to the diameter X and spaced a distance therefrom equal to approximately one fourth the radius of the container. A portion of end wall 34 on one side of the recess 33 is cut back at 35 to form a chordal surface 36 substantially parallel to the end wall 34 for a purpose described hereinafter, leaving a thin lower plate portion 37. Plate 38, which is somewhat less than semi-cylindrical in shape and complementary to the upper baffle plate 30 fits into the remaining portion of the upper cylindrical space, part of which is occupied by baffle plate 30.

Positioned diametrically across the container 10 in the space 40 between and parallel to the adjacent surfaces 41 and 42 of the lower and upper baffle plates 20 and 30, respectively, is a buoyant paddle 43 of low mass in the liquid with which the container is filled. The paddle is generally in the form of an elongated hollow member with the ends sealed. The paddle of the instant embodiment is shown as being formed by two aligned hollow cylinders 44 with their outer ends sealed by threaded caps 45. The inner adjacent ends of reduced diameter of cylinders 44 are each threaded as at 46 into opposite ends of a central paddle mount block 47. However, a paddle of any structural shape or configuration may be employed according to the invention, so long as the mass of the paddle in the liquid is maintained small according to the invention. Theoretically, it is not necessary for the paddle to have any apparent mass when submerged in the liquid, i. e., it may be completely buoyant; all that is required is that it be structurally rigid. The reason for this is that the liquid mass, as will be more clearly seen hereinafter, serves as the rotor. The paddle may be constructed of any material conferring the foregoing mass characteristics on the paddle, such as magnesium, aluminum, plastic and the like.

A shown in Fig. 1, the outer ends of caps 45 are spaced a short distance from the adjacent inner surfaces of wall sections 48 and 49 of the container 10, to give orifices 50. Also, the longitudinal upper and lower edges of the paddle 43 are spaced a short distance from the adjacent surfaces of the upper and lower baffle plates 30 and 20, respectively, to form the parallel longitudinal slots 51. According to this structure, the paddle is free to pivot or rotate about its center in a plane parallel to the top 12 and bottom 13 of the container. The orifices 50 between the ends of the paddle and the wall sections 48 and 49, and the parallel slots 51 between the longitudinal edges of the paddle and baffle plates 20 and 30, coact with the liquid to provide the desired damping effect. Thus, when the instrument is subjected to angular acceleration, the motion of the liquid in the container is damped by viscous drag of the liquid in the container and the energy loss in the passing of the liquid through the orifices and slots.

The paddle 43 is mounted for pivotal movement on a central shaft 60 positioned normal to the top and bottom of the container. Shaft 60 passes through the center of the paddle mount block 47 and is fixed thereto for rotation with the paddle, by means of set screw 61. The shaft is mounted at its lower end in a lower ball bearing 62 disposed in a recess 63 in the upper surface of baffle plate 20, and secured therein by a bearing plate 64 connected to plate 20 by screws 65. Passing through an aperture 66 in the central portion 67 of upper baffle plate 30, the shaft 60 extends centrally through the recess 33 and is positioned at its upper end in an upper ball bearing 68 disposed in a recess 69 in the center of the top 12 of the container, and is secured therein by a bearing plate 70 connected to the top of the container 10 by screws 71.

Connected at one end to shaft 60 as by welding is a torsional spring 75 in the form of a coil. Shaft 60 is formed in two parts, a lower portion 72 and an upper portion 73 having a screw 74 in the lower end thereof which is threadably received in a tapped hole 74' in the upper end of the lower portion 72 of the shaft. The inner end of the coil spring 75 is frictionally clamped between the upper and lower portions 73 and 72 of the shaft adjacent screw 74. The spring is positioned near the bottom of recess 33 in baffle plate 30, and is disposed in a plane perpendicular to shaft 60 and parallel to the top 12 and bottom 13 of the container. The outer end 76 of the spring 75 extends tangentially outward parallel to chordal end walls 34 and 36 of plate 30, and is threadably connected to a coupling 77, the opposite end of which threadably receives one end of a link pin 78 which passes through a guide member 79 on a transducer mount 80 connected to the chordal surface 36 of plate 30 by screws 81. The other end of link 78 is connected to a motion sensing means in the form of a transducer, indicated generally by numeral 82, supported on the mount 80. This may be any type of transducer, for example, an electrical strain gage type transducer including a fixed member and a relatively movable member connected by an electrical strain wire as illustrated in the above Statham Patent No. 2,573,285, or the above-mentioned copending applications Serial Nos. 354,294 or 430,226; or an inductive type transducer, as illustrated in my above-mentioned application Serial No. 328,416. It is seen that chordal surface 36 is cut back from the main chordal surface 34 of baffle plate 30 so as to permit positioning of link 78 substantially in alignment with the outer end portion 76 of spring 75, which extends tangentially from the outer turn 83 of the spring coil.

A typical form of electrical strain wire transducer to which the link pin 78 is connected is illustrated in Figs. 6 to 9. Such transducer is disclosed in the above noted application Serial No. 430,226.

The transducer comprises a sleeve member 132 having an extended portion 134 of reduced outer diameter, the bore 136 of the sleeve being of uniform diameter throughout the length of such sleeve. The enlarged end portion 138 of the sleeve is threaded at 143 for engagement with a fixed member, e. g., 81' of the transducer mount 80, the enlarged end portion 138 of the sleeve carrying a flange 140 which is adapted to abut said member 81' and to act as a stop. Sleeve 132 is positioned along the axis of the link or arm 78.

About the edge of the externally threaded end of sleeve 132 is formed an outwardly extending lip 144 (see Fig. 6) to which is spot welded as at 144' a flexible member or spring 146, the lip 144 affording a clearance space 148 to permit oscillation of the spring 146. Mounted centrally on the flexible diaphragm 146 at 146', as by welding, is a post 149 disposed within the bore 136 of the sleeve and out of contact with the inner surface thereof, the post being threadably engaged at its other end by a threaded connection 151. Connection 151 is secured to the outer end of arm 78, viewing Fig. 2, for longitudinal movement thereof with said post on deflection of the diaphragm 146. Sleeve 132 is provided with angularly disposed adjustable set screws 152 cooperating with grooves 154 in the outer surface of post 149, the ends of the set screws serving to limit the deflection of the diaphragm 146 and the strain wires described below, by limiting the longitudinal movement of post 149.

Referring particularly to Figs. 8 and 9, pins 156 and 156' are positioned diametrically opposite each other on post 149, near one end thereof, and pins 158 and 158' are positioned diametrically opposite each other on post 149 at about the center thereof, the pins 158 and 158' being displaced 90° from the pins 156 and 156'. Pins 156, 156', 158 and 158' extend through slots 159 in sleeve 132, the slots being of sufficient size to permit limited longitudinal displacement of the pins with respect to the sleeve. Connected diametrically opposite each other on the outer surface of the reduced portion 134 of the sleeve 132 near one end thereof, are pins 160 and 160'. Pins 160 and 160' are displaced 90° from pins 156 and 156' and are in longitudinal alignment with pins 158 and 158', respectively, pins 156, 156', 160 and 160' being in a plane normal to the axis of sleeve 132. Connected diametrically opposite each other on sleeve portion 134 near the other end thereof is another set of pins 162 and 162' which are displaced 90° from pins 158 and 158' and are in longitudinal alignment with pins 156 and 156', respectively, pins 158, 158', 162 and 162' being in a plane normal to the axis of sleeve 132. All of the above pins are insulated.

Electrical resistance strain wires 164, 166, 168, and 170 are respectively looped in tension between pins 156 and 162, pins 158 and 160, pins 156' and 162', and pins 158' and 160'.

The four electrical resistance strain wires of the transducer 82 are connected by insulated conductors (not shown) to four insulated terminals 85 spaced along the upper cylindrical wall 11 of the container, the latter terminals being connected in a conventional Wheatstone bridge circuit arrangement in a manner well understood in the art. Baffle plate 30 is cut back along surface 86 adjacent terminals 85 to provide a sufficient space 87 for the inner ends of the terminals and the wires leading from the transducer and which are connected to the terminals.

A corrugated diaphragm 90 extends across the space between the lower baffle 20 and the bottom 13 of the container 10, normal to the central axis thereof, and is held in place by attachment of its outer periphery 91 to the lower surface of lip 22 of flange 21, e. g., by welding. Diaphragm 90 separates said space into an upper chamber 92 and a lower chamber 93. A fill hole 94 for liquid is provided in side wall 11 of container 10, communicating with the space 40 between the lower and upper baffle plates 20 and 30, and a threaded stopper 95 is received in such hole. A bore 96 is provided in the lower baffle plate 20, the bore communicating with the space 40 in which paddle 43 is disposed, and with the chamber 92 below baffle plate 20. Centrally disposed in bottom 13 is a breather hole 97.

Figure 4:
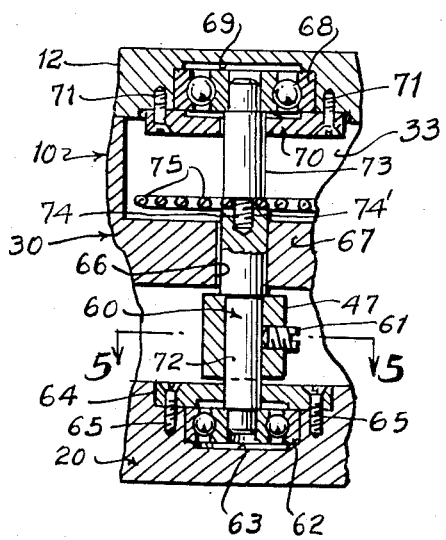
Fig. 4 is an enlarged partial section through certain components of my device shown in Fig. 3.
Figure 5:
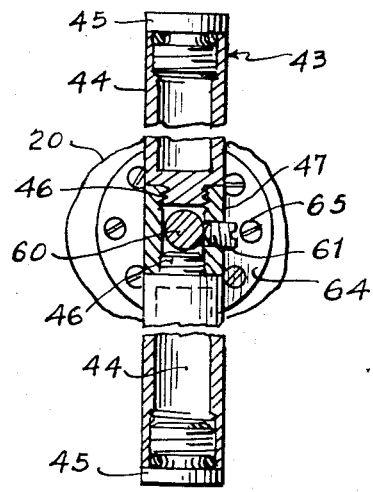
Fig. 5 is a section taken on the line 5—5 of Fig. 3.

To assemble the invention device the upper baffle plate 34 is first secured in position by screws 31. The lower portion 72 of the shaft 60 is then passed through aperture 66 in plate 34, and with the upper end of the upper portion 73 of shaft 60 held in position in the upper bearing 68, the spring 75 is then assembled on shaft 60 in the manner shown in Fig. 4 and described above, i. e., by clamping the inner end of the spring between the lower and upper portions 72 and 73 of shaft 60. The transducer unit 82 including the mount 80 thereof is attached to the end wall 36 of the upper baffle plate 30, and the link 78 and end portion 76 of spring 75 are screwed into coupling 77. The paddle 43 is then mounted on the shaft 60 in the manner described above, after which the lower baffle plate 20 with O-ring 24 and the corrugated diaphragm 90 mounted thereon is placed in position, and the lower end of shaft 60 is disposed in the lower bearing 62. Then the bottom 13 is secured in place against the lower end of cylindrical wall 11, clamping the lip 22 of flange 21 in place, and the screws 15 are applied to fasten the bottom to the container.

All of the inner spaces of the device between the top 12 of the container and the corrugated diaphragm 90 are filled with a liquid, the liquid being introduced through the fill hole 94, which is then stoppered by plug 95. The liquid passes from the space 94' to the chamber 92 through the bore 96. Any suitable liquid may be employed to give the desired damping effect. While I may choose from a wide variety of liquids, a particularly useful liquid is the synthetic silicone polymer which have flat viscosity temperature lines on the A. S. T. M. chart.

It will be observed that when the instrument shown in the drawings is subjected to an angular acceleration about the central axis thereof, which is parallel to the cylindrical side wall 11 of the container 10, the liquid in the container tends to flow in one direction or the other with respect to the inner side walls of the container through orifices 50 adjacent the opposite ends of paddle 43, and slots 51 adjacent the top and bottom longitudinal edges of the paddle. Under these conditions the pressure at one side of the paddle 43 is greater than at the other side. The paddle then deflects or pivots due to this pressure difference until the torque resulting from the pressure difference is balanced by the torque in the spring 75 resulting from the deflection, and the tension in the strain wires of the transducer, where this type of transducer is employed.

Since the paddle is substantially buoyant and of relatively negligible mass in the liquid in the container 10, the liquid itself serves as the movable mass or rotor. Because of the spring connection 75 between the shaft 60 (which is caused to rotate through the paddle in response to movement of the mass of liquid) and the link 78 to the transducer 82, the amount of linear displacement of link pin 78 caused by angular displacement of the liquid rotor will be different from, e. g., smaller than, the amount of linear displacement which would be obtained if the shaft 60 were positively connected to link pin 78 in a conventional manner.

Thus, for example, acceleration of the container 10 in a counterclockwise direction as viewed in Fig. 2 causes the mass of liquid and paddle 43 to be displaced in a clockwise direction proportional to the rate of acceleration. Rotation of paddle 43 produces a corresponding rotation of shaft 60 and a torsional moment on spring 75 in a direction such as to tighten or contract same, and cause the end portion 76 of the spring to move linearly to the left, carrying the link pin 78 with it. Where a strain wire transducer is employed, this will increase the tension in at least some of the strain wires. The change in resistance of the respective strain wires produces an output from the bridge circuit including terminals 85 which is linearly proportional to the amount of linear displacement of link pin 78 and also the amount of angular displacement of shaft 60, and hence proportional to the acceleration producing the displacement of the liquid mass in the container.

An acceleration of container 10 in a clockwise direction as viewed in Fig. 2, causes the mass of liquid and paddle 43 to be displaced in a counterclockwise direction proportional to the rate of acceleration. This produces a like rotation of shaft 60 and a torsional moment on spring 75 in a direction such as to expand same and cause the end portion 76 thereof to move linearly to the right, carrying the link pin 78 with it. This action will relax the tension in at least some of the transducer strain wires, the resulting electrical output from the bridge circuit corresponding to the acceleration as described above.

It is seen from the structure of my device as described above that the displacement of the liquid mass in the container 10 is made independent of and different from the variation in tension of the strain wires of the transducer resulting from the displacement of such mass. By adjusting the spring constant of spring 75, i. e., its stiffness, relative to the strain wires, I can maintain for any desired maximum variation of extension of the wires to be obtained upon a maximum chosen acceleration, any desired displacement of the mass. Hence, in accordance with the invention, a displacement of the liquid mass can be obtained which is greater in magnitude than the simultaneous variation in extension of the strain wires.

While I have described a particular embodiment of my invention for the purpose of illustration, it should be understood that various modifications and adaptations thereof may be made within the spirit of the invention as set forth in the appended claims.

I claim:

1. A motion sensing device comprising a movable member mounted for limited angular motion, a transducer, said transducer including two relatively movable members, means having stiffness to constrain the relative motion of said relatively movable members and means for resiliently connecting said first movable member and said relatively movable members, said resilient connecting means having a stiffness less than the stiffness of said means for constraining the relative motion of said relatively movable members.

2. A motion sensing device comprising a movable liquid mass, a movable member mounted for limited angular motion in said liquid mass, a transducer, said transducer including two relatively movable members, means having stiffness to constrain the relative motion of said relatively movable members, and a motion transmitting device responsive to the motion of said movable mass and of said first mentioned movable member, and transmitting said motion to said relatively movable members, said motion transmitting device including a resilient connection between said motion transmitting device and said movable members.

3. A moiton sensing device comprising a container, a liquid mass in said container, a transducer, said transducer including two relatively movable members, means having stiffness to constrain the relative motion of said relatively movable members, a paddle mounted for rotation in said container, said paddle being responsive to the motion of said liquid in said container and transmitting said motion to said relatively movable members, and a resilient connection between said paddle and said movable members.

4. A motion sensing device comprising a container, a liquid in said container, a strain wire transducer, a paddle mounted for limited angular motion in said container, said paddle being responsive to the motion of said liquid in said container and transmitting said motion to said transducer, and a spring connection between said paddle and said transducer, whereby the motion of the paddle is transmitted through said spring connection to the transducer.

5. A motion sensing device, comprising a closed chamber, said chamber having opposing cylindrical walls, liquid in said chamber, a buoyant paddle of low mass, a hinge for said paddle, said hinge being mounted in said chamber and connected to said paddle, said paddle being rotatably mounted about said hinge on the axis of said cylinder, for limited angular motion of said paddle about the said axis, said paddle extending from one wall to the opposing wall and immersed in said liquid, opposing edges of said paddle being adjacent the opposing cylindrical walls, a motion sensing means to sense the angular displacement of said paddle, and a resilient connection between said paddle and said motion sensing means to sense the angular displacement of said paddle, whereby the motion of the paddle is transmitted through said resilient connection to said motion sensing means.

6. A motion sensing device comprising a closed chamber, liquid in said chamber, a buoyant paddle of low mass immersed in said liquid, a shaft rotatably mounting said paddle for limited angular motion of said paddle about said shaft, a yieldable motion sensing means to sense the angular displacement of said paddle and a resilient connection between said shaft and said motion sensing means, whereby the motion of the paddle is transmitted through said resilient connection to said motion sensing means.

7. A motion sensing device comprising a closed chamber, liquid in said chamber, a buoyant paddle of low mass immersed in said liquid, a shaft rotatably mounting said paddle for limited angular motion of said paddle about said shaft, an electrical strain wire transducer to sense the angular displacement of said mass, and a connecting means between said paddle and said transducer such that the displacement of said paddle is independent of the variation in extension of the strain wire of said transducer resulting from the displacement of said paddle, whereby the motion of the paddle is transmitted through said connection to the transducer.

8. A motion sensing device comprising a closed chamber, liquid in said chamber, a buoyant paddle of low mass immersed in said liquid, a shaft rotatably mounting said paddle for limited angular motion of said paddle about said shaft, an electrical strain wire transducer to sense the angular displacement of said mass, and a resilient connection between said shaft and said motion sensing means.

9. A motion sensing device comprising a closed chamber, liquid in said chamber, a buoyant paddle of low mass immersed in said liquid, a shaft rotatably mounting said paddle for limited angular motion of said paddle about said shaft, an electrical strain wire transducer to sense the angular displacement of said mass, and a torsion spring connection between said shaft and said motion sensing means.

10. A motion sensing device, comprising a closed cylindrical chamber, said chamber having opposing cylindrical walls, liquid in said chamber, a buoyant paddle of low mass, said paddle having a low weight when immersed in said liquid, a shaft for said paddle, said shaft connected to said paddle, and positioned normal thereto, a mounting in said chamber for said shaft, said paddle being rotatably mounted about said shaft on the axis of said cylindrical chamber for limited angular motion of said paddle about the said axis, said paddle extending from one wall to the opposing wall and immersed in said liquid, opposing edges of said paddle being adjacent the opposing cylindrical walls, at least one edge of said paddle being closely spaced from the adjacent cylindrical wall of the container, baffles disposed closely adjacent the longitudinal edges of said paddle, a motion sensing means to sense the angular displacement of said paddle, and a resilient connection between said shaft and said motion sensing means, whereby the motion of the paddle is transmitted through said resilient connection to said motion sensing means.

11. A motion sensing device comprising a closed cylindrical chamber, said chamber having opposing cylindrical walls, liquid in said chamber, a paddle in the form of a hollow elongated member with sealed ends, a shaft for said paddle, a mounting in said chamber for said shaft, said paddle being rotatably mounted on said shaft on the axis of said cylindrical chamber for limited angular motion of said paddle about the said axis, opposing edges of said paddle lying closely adjacent the cylindrical wall of the container, a pair of baffles, one fixedly mounted above and the other fixedly mounted below said paddle, said baffles being disposed parallel to the axis of said paddle and spaced closely adjacent thereto, said baffles being substantially coextensive with said paddle, a motion sensing means to sense the angular displacement of said paddle and a torsion spring connection between said shaft and said motion sensing means.

12. A motion sensing device, comprising a closed chamber, a liquid in said chamber, a buoyant paddle of low mass in said chamber immersed in said liquid, a mounting for said paddle fixedly mounted in said chamber, said paddle being movably mounted in said chamber with an edge of said paddle adjacent, but out of contact with, an enclosing wall of said chamber, the separation between the edge of the paddle and the wall forming a fluid communicating passageway for fluid movement from one side of said paddle to the other side thereof, said paddle having opposing surfaces immersed in said liquid, said paddle being positioned on said mounting for limited angular motion thereon, baffles above and below said paddle, said baffles being disposed parallel to the axis of said paddle and spaced closely adjacent thereto to form fluid communicating passages between said paddle and said baffles, a motion sensing means to sense the angular displacement of said paddle and a torsion spring connection between said mounting and said motion sensing means.

13. A motion sensing device comprising a closed chamber, a liquid therein constituting an inertial mass, a member movable angularly in response to angular displacement of said liquid mass, a motion sensing means to sense the angular displacement of said member and a resilient connection between said member and said motion sensing means.

14. A motion sensing device comprising a closed chamber, a liquid therein constituting an inertial mass, a paddle movable angularly in response to angular displacement of said liquid mass, a strain wire transducer to sense the angular displacement of said paddle, and a torsion spring connection between said paddle and said strain wire transducer.

15. A motion sensing device, comprising a closed chamber, said chamber having opposing cylindrical walls, liquid in said chamber, a rigid buoyant paddle of low mass, said paddle having a low weight when immersed in said liquid, a shaft for said paddle, said shaft being connected to said paddle and positioned normal thereto, a paddle mounting in said chamber positioned on said shaft, said paddle being rotatably mounted on said shaft on the axis of said cylinder for limited angular motion of said paddle about the said axis, said paddle extending from one wall to the opposing wall and immersed in said liquid, opposing edges of said paddle being positioned adjacent the opposing cylindrical walls, a pair of baffles, one fixedly mounted above and the other fixedly mounted below said paddle, said baffles being disposed parallel to the axis of said paddle and spaced closely adjacent thereto, said baffles being substantially coextensive with said paddle, a yieldable motion sensing means to sense the angular displacement of said paddle and a resilient connection between said shaft and said motion sensing means.

16. A motion sensing device, comprising a closed chamber, said chamber having opposing cylindrical walls, liquid in said chamber, a rigid, balanced buoyant paddle of low mass, said paddle being in the form of a hollow member with cylindrical end portions, said portions having sealed ends, said paddle having a low weight when immersed in said liquid, a shaft for said paddle, said shaft being connected to said paddle and positioned normal thereto, a paddle mounting in said chamber positioned on said shaft, said paddle being rotatably mounted on said shaft on the axis of said cylinder for limited angular motion of said paddle about the said axis, said paddle extending from one wall to the opposing wall and immersed in said liquid, opposing edges of said paddle being closely adjacent the opposing cylindrical walls, the separation between the edges of said paddle and the adjacent walls forming fluid communicating passageways, a pair of aligned baffles, one fixedly mounted above and the other fixedly mounted below said paddle, said baffles being disposed parallel to the axis of said paddle and spaced closely adjacent thereto, said baffles being substantially coextensive with said paddle and forming fluid communicating slots between said paddle and said baffles, a yieldable motion sensing means to sense the angular displacement of said paddle, and a resilient connection between said shaft and said motion sensing means, said passageways, and said slots permitting fluid movement from one side of said paddle to the other side thereof.

17. A motion sensing device, comprising a closed chamber, said chamber having opposing cylindrical walls, liquid in said chamber, a rigid, balanced buoyant paddle of low mass, said paddle being in the form of a hollow member with cylindrical end portions, said portions having sealed ends, said paddle having a low weight when immersed in said liquid, a shaft for said paddle, said shaft being connected to said paddle and positioned normal thereto, a paddle mounting in said chamber positioned on said shaft, said paddle being rotatably mounted on said shaft on the axis of said cylinder for limited angular motion of said paddle about the said axis, said paddle extending from one wall to the opposing wall and immersed in said liquid, opposing edges of said paddle being closely adjacent the opposing cylindrical walls, the separation between the edges of said paddle and the adjacent walls forming fluid communicating passageways, a pair of baffles, one fixedly mounted above and the other fixedly mounted below said paddle, said baffles being disposed parallel to the axis of said paddle and spaced closely adjacent thereto, said baffles being substantially coextensive with said paddle and forming fluid communicating slots between said paddle and said baffles, a strain wire transducer to sense the angular displacement of said paddle, and a coil spring connection between said paddle and said strain wire transducer, said passageways and said slots permitting fluid movement from one side of said paddle to the other side thereof.

References Cited in the file of this patent
UNITED STATES PATENTS

| | | |
|---|---|---|
| 2,453,549 | Statham | Nov. 9, 1948 |
| 2,481,792 | Statham | Sept. 13, 1949 |
| 2,636,964 | Lancor | Apr. 28, 1953 |
| 2,681,566 | Ruge | June 22, 1954 |
| 2,697,158 | Epstein et al. | Dec. 14, 1954 |
| 2,721,919 | Yao T. Li et al. | Oct. 25, 1955 |